(12) United States Patent
Bhide et al.

(10) Patent No.: US 12,248,853 B2
(45) Date of Patent: Mar. 11, 2025

(54) GENERATION OF MACHINE LEARNING MODEL LINEAGE EVENTS

(71) Applicant: International Business Machines Corporation, Armonk, NY (US)

(72) Inventors: Manish Anand Bhide, Hyderabad (IN); Harivansh Kumar, Hyderabad (IN); Arunkumar Kalpathi Suryanarayanan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 17/033,832

(22) Filed: Sep. 27, 2020

(65) Prior Publication Data
US 2022/0101180 A1   Mar. 31, 2022

(51) Int. Cl.
| | |
|---|---|
| G06F 8/65 | (2018.01) |
| G06F 8/71 | (2018.01) |
| G06F 18/2113 | (2023.01) |
| G06N 20/00 | (2019.01) |
| G06V 10/75 | (2022.01) |

(52) U.S. Cl.
CPC ............ *G06N 20/00* (2019.01); *G06F 8/65* (2013.01); *G06F 18/2113* (2023.01); *G06V 10/757* (2022.01); *G06F 8/71* (2013.01)

(58) Field of Classification Search
CPC .. G06N 20/00; G06V 10/757; G06F 18/2113; G06F 8/65
See application file for complete search history.

(56) References Cited

U.S. PATENT DOCUMENTS

| | | | | |
|---|---|---|---|---|
| 10,346,304 | B2 * | 7/2019 | Xu | G06F 11/3438 |
| 11,263,003 | B1 * | 3/2022 | Gan | G06F 16/219 |
| 11,280,777 | B2 * | 3/2022 | Farkas | G01N 21/94 |
| 11,461,714 | B1 * | 10/2022 | Mifflin | G06N 20/00 |
| 11,501,200 | B2 * | 11/2022 | Dhanyamraju | G08B 21/18 |
| 2018/0052878 | A1 | 2/2018 | Seetharaman et al. | |

(Continued)

OTHER PUBLICATIONS

"Managing models," Model management—IBM Watson, IBM Watson Studio, May 29, 2020, Last Updated Apr. 17, 2020, 2 pages, https://dataplatform.cloud.ibm.com/docs/content/wsj/analyze-data/ml-manage-models.html.

(Continued)

*Primary Examiner* — Beau D Spratt
(74) *Attorney, Agent, or Firm* — Kelsey M. Skodje

(57) ABSTRACT

A method, system, and computer program product for generating lineage events of machine learning models. The method may include identifying a machine learning model with missing lineage. The method may also include generating a creation event and deployment event for the machine learning model. The method may also include generating a version change event for the machine learning model. Generating the version change event may include identifying one or more predicted data points with a low model confidence; rescoring the one or more predicted data points based on the machine learning model at a second time period; determining that the updated one or more predicted data points are significantly different than the one or more predicted data points; and determining that there is a new version of the machine learning model. The method may also include creating a lineage path for the machine learning model.

20 Claims, 5 Drawing Sheets

(56) References Cited

U.S. PATENT DOCUMENTS

| | | | | |
|---|---|---|---|---|
| 2019/0171897 | A1* | 6/2019 | Merai | G06N 5/048 |
| 2019/0378061 | A1* | 12/2019 | Cao | G06N 3/08 |
| 2020/0082296 | A1* | 3/2020 | Fly | G06N 7/01 |
| 2020/0272919 | A1* | 8/2020 | Haimson | G06N 20/00 |
| 2020/0320349 | A1* | 10/2020 | Yu | H04L 9/3236 |
| 2021/0333995 | A1* | 10/2021 | Grossman | H04L 63/0263 |
| 2022/0374003 | A1* | 11/2022 | Uzunbas | G05B 19/41875 |

OTHER PUBLICATIONS

"Lineage for assets (Watson Knowledge Catalog)," Asset lineage | IBM Cloud Pak for Data, May 2, 2020, 3 pages, https://www.ibm.com/support/producthub/icpdata/docs/content/SSQNUZ_current/wsj/getting-started/lineage.html.

"MLOps: Model management, deployment, and monitoring with Azure Machine Learning," Microsoft Docs, Mar. 17, 2020, 8 pages, https://docs.microsoft.com/en-us/azure/machine-learning/concept-model-management-and-deployment.

Samiullah, "Monitoring Machine Learning Models in Production," ChristopherGS, Mar. 14, 2020, 21 pages, https://christophergs.com/machine%20learning/2020/03/14/how-to-monitor-machine-learning-models/.

Raj, "Robust and scalable Machine Learning lifecycle for a high performing AI team," TietoEVRY, Dec. 20, 2019, 6 pages, https://www.tietoevry.com/en/blog/2019/12/robust-and-scalable-ml-lifecycle-for-a-high-performing-ai-team/.

* cited by examiner

200

Identify one or more predicted data points with a low model confidence 210

Determine a model confidence value for each data point 212

Compare each model confidence value to a threshold model confidence value 214

Determine that one or more data points have a confidence value less than or equal to the threshold model confidence value 216

Flag the one or more data points for low model confidence 218

Rescore the one or more predicted data points 220

Updated predicted data points significantly different than the predicted data points? 230

Yes → New version of the machine learning model 240 → Generate the version change event 260

No → Machine learning model has not changed versions 250

FIG. 2

GENERATION OF MACHINE LEARNING MODEL LINEAGE EVENTS

BACKGROUND

The present disclosure relates to machine learning systems and models and, more specifically, to automatically capturing and generating lineage events of machine learning models.

Machine learning models may be increasingly used in technology. Machine learning models may be used to help improve the workings of technology (for example, by helping the technology work better, smarter, and faster and/or more efficiently). Machine learning models may go through multiple phases throughout the lifecycle of the model. For instance, the machine learning model may be created (for example, from a data set), built/trained, deployed into a pre-production environment, promoted into a production environment, adjusted or changed into a new version of the model, used for batch predictions/scoring, demoted out of a production environment, etc. The machine learning model may go from phase to phase, sometimes circling back to various phases, until the end of the model's lifecycle when it is no longer in use and/or no longer exists. The various phases/events of the lifecycle may help increase the knowledge and understanding of the machine learning model and may be used to help better and improve the model throughout its lifecycle.

SUMMARY

The present invention provides a computer-implemented method, system, and computer program product to capture and generate lineage events of machine learning models. The method may include identifying a machine learning model with missing lineage. The method may also include generating a creation event and deployment event for the machine learning model. The method may also include generating a version change event for the machine learning model. Generating the version change event may include identifying one or more predicted data points with a low model confidence. Generating the version change event may also include rescoring the one or more predicted data points based on the machine learning model at a second time period, resulting in updated one or more predicted data points. Generating the version change event may also include determining that the updated one or more predicted data points are significantly different than the one or more predicted data points. Generating the version change event may also include inferring, based on the determining, that there is a new version of the machine learning model. The method may also include creating a lineage path for the machine learning model based on the creation event, the deployment event, and the version change event. The computer program product may include similar steps.

The system may be configured to identify a machine learning model with missing lineage. The system may also be configured to generate a creation event and deployment event for the machine learning model. The system may also be configured to generate a batch scoring event for the machine learning model. Generating the batch scoring event may include identifying an amount of target batch records for each target batch and an amount of source batch records for each source batch for the machine learning model. Generating the batch scoring event may also include comparing the amount of source batch records for each source batch. Generating the batch scoring event may also include determining, based on the comparing, whether a plurality of source batch records have an equal amount of records. Generating the batch scoring event may also include mapping, based on the determining, each source batch to each corresponding target batch. The system may also be configured to create a lineage path for the machine learning model based on the creation event, the deployment event, and the batch scoring event.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 depicts a flowchart of a set of operations for generating a version change event, according to some embodiments.

Figure 1:
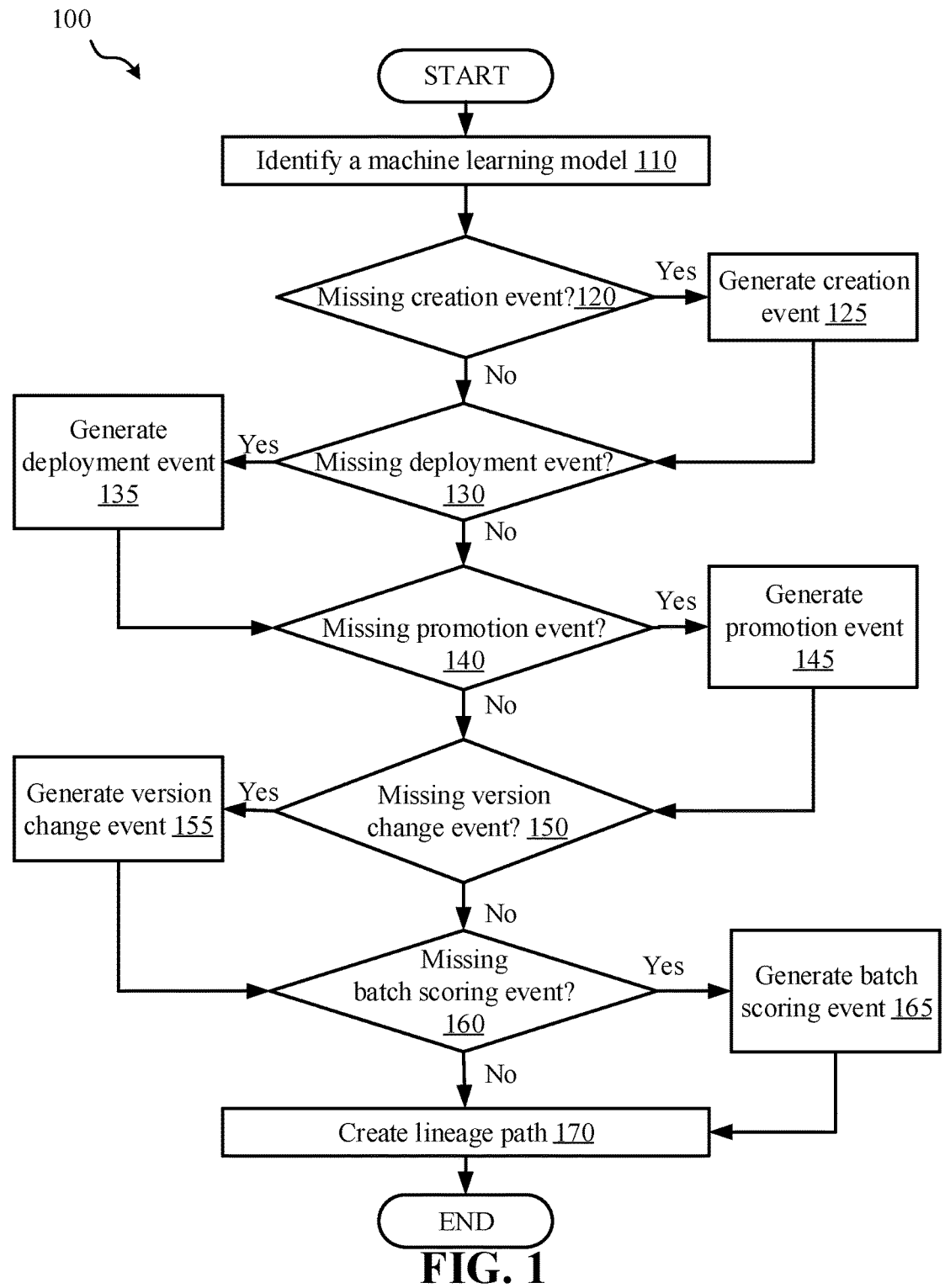
FIG. 1 depicts a flowchart of a set of operations for identifying and generating missing lineage events, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to machine learning systems and models and, more specifically, to automatically capturing and generating lineage events of machine learning models. While the present disclosure is not necessarily limited to such applications, various aspects of the disclosure may be appreciated through a discussion of various examples using this context.

Machine Learning (ML) may be on the rise in various industries. Given this, it may become very important to keep track of various events in the life-cycle of the models in ML system to gain more information about the models. Events like model creation, its validation and evaluation, its deployment into pre-production, its promotion to production, its change to a new version of the model, and other events can used to solve various problems and to help improve the model. For example, if a version change event (i.e., where a machine learning model changed to a new version) occurred a few days after the machine learning model was released into production, it may indicate that the original model did not do well in production. This information may be used by the system and/or developers to help figure out what went wrong with the original model and how to fix the model.

Discovering and tracking the machine learning model may go on even after deployment and production of the model in order to continuously monitor various aspects of the model and keep track of its functionality. This tracking may help the system, data scientists, model developers, validators, etc. determine what a model has undergone through its life cycle. The tracking may also help identify the various decisions the machine learning model has been making and may even help determine why the model was making those decisions. For example, a promotion event may indicate when a machine learning model was promoted from pre-production to production. The promotion event may include a time (e.g., year, month, day, time, etc.) when the promotion event occurred. Using the promotion event and the time of the promotion event, the system may be able to find the model as it was during pre-production and the model when it was released into actual production. These models may be compared, in this example, and the system may learn the behaviors of the model and the decisions it was making both during pre-production and during production. Analyzing and comparing the differences in model decisions at its various phases (e.g., pre-production and production) may help developers and/or the system learn how various data, knowledge, changes, etc. affected the model.

To keep track of these various events, a lineage path may be used. A lineage path, as referred to herein, may be a recordation (e.g., storing) of the various lineage events of the machine learning model. In some embodiments, each lineage event may include a time (e.g., day, month, year, hour, minute, second, etc.) that the event occurred. For example, a creation lineage event may include that the machine learning model was created on Jul. 22, 2020. In some embodiments, the lineage event may include other information about the machine learning model. For example, again using the creation lineage event, the creation lineage event may also include an indication of (for example, a link to) the data set that was used to create the machine learning model. In this example, the creation lineage event may include indications of (for example, links to) other models that are related to the machine learning model. For example, the machine learning model may change versions, and the new version of the model may change versions, etc. Each of the versions of the model may have originated from the initial created machine learning model. Therefore, the creation event may include information about the new versions of the model that have since been created.

In some embodiments, the lineage path may be a lineage tree (e.g., similar to a decision tree). In some instances, a lineage system may be used to store the lineage path(s) and these different events. A lineage system may be a system or a component of a system (e.g., a memory, database, etc.) that stores various lineage events and lineage paths for the machine learning models. In some embodiments, the lineage system may be on and/or connected to the machine learning system.

However, conventional machine learning systems may not keep track of these various events (for example, by not publishing events to a lineage system) in a model lifecycle. Conventional machine learning systems may be built to only serve the functionality of the system/model without doing any additional steps. The additional steps, such as tracking the various lifecycle (or lineage) events, may be an overhead that is conventionally ignored and avoided by machine learning developers when developing a conventional machine learning system.

As discussed herein, tracking and recording the various lineage events may result in multiple benefits and improvements for the machine learning model and system. For instance, the various phases, or events, of the lifecycle may help increase the knowledge and understanding of the machine learning model and may be used to help improve (e.g., increase efficiency, accuracy, etc.) the model throughout its lifecycle. Additionally, keeping track of the lineage events may help ensure credibility and transparency of the machine learning model when the model is deployed in production.

The present invention provides a computer-implemented method, system, and computer program product to capture and generate lineage events of machine learning models. This may help define credibility and transparency of the machine learning model and may help an owner and/or developer of the model keep track of the model evolution. Some key events in a lifecycle may include a creation event (when the model is built and/or created), a deployment event (when the model is deployed into a pre-production environment), a promotion event (when the model is promoted from a pre-production environment to a production environment), a version change event (when the model changes from one version to another (for example, when a new version of the model is released)), and a batch scoring event (when the model is used for bulk predictions/scoring). Other events during the lifecycle of the model may also be captured and generated.

In some instances, a machine learning model may already have undergone one or more lifecycle events without those lifecycle events being tracked. For example, a machine learning model may be promoted into development without having the creation, deployment, and/or promotion events tracked or recorded. To generate these events, the system may be periodically crawled or searched through to discover machine learning models. Once the machine learning model is discovered, and it is determined that the model is missing one or more lineage events, the system may analyze the model and generate the various historical lineage events (for instance, the creation, deployment, and/or promotion events in the above example) that had already occurred for the machine learning model. These events may be recorded and/or stored. In some instances, once the model is discovered, the system may start tracking the machine learning model. The tracking may help determine any version changes (or other events) that may occur with the machine learning model. In some embodiments, the machine learning system may include artificial intelligence (AI) and the machine learning models may be used with artificial intelligence.

Referring now to FIG. 1, a method 100 for identifying and generating missing lineage events is depicted, according to some embodiments. In some embodiments, method 100 is executed by a server (e.g., computer system/server 502 (FIG. 5)) on or connected to a computer system (e.g., computer system 500 (FIG. 5)). In some embodiments, the method 100 is implemented as a computer script or computer program (e.g., computer executable code) to be executed on or connected to the computer system. In some embodiments, the method 100 is executed by a processor (e.g., processing unit 510 (FIG. 5)) on or connected to a computer system (e.g., computer system 500 (FIG. 5)).

Method 100 includes operation 110 to identify a machine learning model. A system (referred to as a machine learning system) may house machine learning models and information about those machine learning models. For example, a system that does debugging work may house machine learning models that assist with debugging. In another example, a system may be used for data predictions. This system may house machine learning prediction models to execute the various predictions. In some embodiments, the system performing method 100 is the machine learning system. In some embodiments, the system performing method 100 is on or connected to the machine learning system. Examples of machine learning systems that house various models and their deployment information may include Azure® Machine Learning, Amazon SageMaker®, systems with docker containers (for example, the models may be deployed in docker containers), etc. In some embodiments, identifying a machine learning model may include selecting a machine learning model (from the machine learning models) that is housed on the machine learning system.

In some embodiments, the machine learning model may have missing lineage. For example, the machine learning model may be deployed into production. In this example, the machine learning model may be selected or identified after it is in production. The previous events of the machine learning model (for example, its creation, deployment, and promotion) may not be stored on the machine learning system and the machine learning system may have no (or at least minimal) knowledge of when these events occurred and the various details of each event. Therefore, in this example, the creation, deployment, and promotion events of the machine learning model may be missing lineage events.

In some embodiments, identifying the machine learning model with missing lineage includes receiving access to the machine learning system that houses one or more machine learning models. In some embodiments, the system may gain, or receive, access to the machine learning system in order to receive data and information about the machine learning models. In some instances, receiving access may include registering the machine learning system. For example, a user (e.g., a developer, client, etc.) may provide details about the machine learning system as well as permission to access the machine learning system. The machine learning system may then be registered and access may be gained to the machine learning system. Once the machine learning system is registered, the system may be able to access various information and data on the machine learning system.

In some embodiments, identifying the machine learning model with missing lineage includes crawling the machine learning system. Crawling may include searching through the machine learning system and grabbing information from it. In some instances, a program, a bot, and/or a script may crawl through the machine learning system to find information. In some embodiments, the crawling of the machine learning system may not occur until the system is registered and/or permission is received to access the machine learning system.

In some embodiments, identifying the machine learning model with missing lineage includes discovering, in response to the crawling, a machine learning model. As the machine learning system is being crawled through, the crawling may identify various machine learning models. In some embodiments, the discovered machine learning model may be the first machine learning model identified from the crawling. In some embodiments, the discovered machine learning model may be a machine learning model selected (for example, by a user, by the system, etc.) from a plurality of machine learning models that were identified from the crawling.

In some embodiments, identifying the machine learning model with missing lineage includes searching the lineage system for the machine learning model. A lineage system may be a system or a component of a system (e.g., a memory, database, etc.) that stores various lineage events and lineage paths for the machine learning models. In some embodiments, the lineage system may be on and/or connected to the machine learning system. In some instances, the machine learning model and/or events that have occurred for the machine learning model may be stored in the lineage system. In some instances, the lineage system may include lineage paths and/or lineage events for other machine learning models, but may not include lineage path(s) and/or events for the machine learning model. In some instances, a lineage system may not exist for the machine learning system and lineage events for the machine learning models may not have been stored. In this instance, any models on the machine learning system may be machine learning models with missing lineage, because none of their lineage events were recorded/stored.

In some embodiments, identifying the machine learning model with missing lineage includes determining that one or more historical lineage events are missing for the machine learning model. If the machine learning model and/or all machine learning models of the machine learning system are not on the lineage system, then the machine learning model may have missing lineage. Put differently, if there are no lineage events and/or paths for the machine learning model stored on the lineage system, then none of these lineage events were tracked and recorded, and these missing lineage events may all be missing lineage for the machine learning model.

In some instances, the machine learning model may have some lineage events and/or lineage path(s) stored on the lineage system. In this instance, identifying the machine learning model with missing lineage may include analyzing the lineage events for the machine learning model that are stored on the lineage system and determining whether any lineage events are missing. For example, the lineage system may include a deployment event (e.g., when the model is deployed into pre-production) and a version change event (e.g., when the version of the model changes). However, before a model is deployed, it may need to be created. Therefore, in this example, the lineage system may be missing a creation event for the machine learning model. Further, in this example, the version change event may be analyzed to determine details about the version change event. If the version change event occurred a while after the model was deployed (for example, months, years, etc.), then there may be a chance that the model was promoted to production (i.e., a promotion event occurred) before the version change event occurred. In this example, the promotion event may be a tentatively missing lineage event. In some instances, if there is any tentatively missing lineage, the machine learning model may be identified as having missing lineage.

In some embodiments, operations 120, 130, 140, 150, and 160 may determine whether there are any missing lineage events for the machine learning model. In some embodiments, it may first be determined whether there are any tentatively missing historical lineage events for the machine learning model, and then method 100 may proceed to operation 120. Operations 120, 130, 140, 150, and 160, in this instance, may determine whether there are any actual missing lineage events.

Method 100 includes operation 120 to determine whether there is a missing creation event for the machine learning model. A creation event may be a lineage event for when the model is created. In some embodiments, the creation event may also include the building and training of the machine learning model (for example, using a training data set). In some embodiments, the building and/or training of the machine learning model may be separate lineage events. Determining whether there is a missing creation event may include searching a lineage system (for example, for the machine learning system) for a creation event for the machine learning model. If there is no lineage system and/or no information about any lineage events, then the machine learning model may be missing all of its lineage events. In some instances, if there is a lineage system and/or stored information about lineage of machine learning models, but no information about the specific machine learning model, then the machine learning model may be missing all of its lineage events.

In some instances, if there is a lineage system and/or stored information about lineage of machine learning models, and if the stored information includes information about the specific machine learning model, then the information may need to be reviewed/analyzed to determine whether there is a creation event for the machine learning model. Reviewing and/or analyzing the information about the specific machine learning model (for example, in a lineage system (e.g., lineage system 400 (FIG. 4))) may include determining whether there is any information about when the machine learning model was created. If there is information about when the machine learning model was created, then a creation event may exist. If there is not information about when the machine learning model was created, then there may be a missing creation event for the model.

If it is determined (in operation 120) that there is a missing creation event, method 100 may proceed to operation 125 to generate the creation event. In some embodiments, to generate the creation event, the machine learning system may be crawled to determine when the machine learning model was first mentioned and/or stored on the machine learning system. For example, the lineage system corresponding to the machine learning system may have a deployment event for the machine learning system that was recorded on Jan. 5, 2015 (for example, at 10:55:08 PM). 10:55:08 PM on Jan. 5, 2015 may be the earliest date/time that the machine learning model was recorded, in this example. Therefore, in this example, Jan. 5, 2015 (for instance, at 10:55:08 PM) may be used as the time of creation of the machine learning model and may be recorded as the creation event of the machine learning model. In some embodiments, the creation event may include additional information relating to the machine learning model. In some instances, the creation event may be referred to as an approximate and/or discovered creation event, as the date/time used for the model creation may not be completely accurate.

In another example, the machine learning system may include information that a data set was used to train the machine learning model in March 2017. This information, in this example, may not be stored on the lineage system but may be accessible via the crawling of the machine learning system. In this example, March 2017 may be the earliest mention of the machine learning model, therefore March 2017 may be used for the creation event of the machine learning model.

Once the creation event is determined, method 100 may proceed to operation 130. Additionally, if it is determined (in operation 120) that there is not a missing creation event, method 100 may proceed to operation 130.

Method 100 includes operation 130 to determine whether there is a missing deployment event for the machine learning model. A deployment event may be a lineage event for when the model is deployed into a pre-production environment. For example, in some instances, a model may be deployed into a pre-production environment after the machine learning model has been trained, in order to identify any problems and debug the model before it is released into production. Determining whether there is a missing deployment event may include searching a lineage system (for example, for the machine learning system) for a deployment event for the machine learning model. If there is no lineage system and/or no information about any lineage events, then the machine learning model may be missing all of its lineage events. In some instances, if there is a lineage system and/or stored information about lineage of machine learning models, but no information about the specific machine learning model, then the machine learning model may be missing all of its lineage events.

In some instances, if there is a lineage system and/or stored information about lineage of machine learning models, and if the stored information includes information about the specific machine learning model, then the information may need to be reviewed/analyzed to determine whether there is a deployment event for the machine learning model. Reviewing and/or analyzing the information about the specific machine learning model (for example, in a lineage system (e.g., lineage system 400 (FIG. 4))) may include determining whether there is any information about when the machine learning model was deployed and/or placed into pre-production. If there is information about when the machine learning model was put into pre-production, then a deployment event may exist. If there is not information about when the machine learning model was put into pre-production, then there may be a missing deployment event for the model.

If it is determined (in operation 130) that there is a missing deployment event, method 100 may proceed to operation 135 to generate the deployment event. In some embodiments, to generate the deployment event, the machine learning system may be crawled to determine when the machine learning model was first mentioned, recorded, etc. as being in pre-production and/or production.

For example, the lineage system corresponding to the machine learning system may have a promotion event for the machine learning system that was recorded on Sep. 15, 2015 (for example, at 12:02 AM). The promotion event may indicate that the model was promoted into production. 12:02 AM on Sep. 15, 2015 may be the earliest date/time that the machine learning model was recorded as being in some sort of pre-promotion or promotion environment, in this example. Therefore, in this example, Sep. 15, 2015 (at 12:02 AM) may be used as the time of deployment of the machine learning model and may be recorded as the deployment event of the machine learning model. In this example, the deployment event may be an approximate deployment event, as it is the same as the promotion event (in this example). In some embodiments, the deployment event may include additional information relating to the machine learning model. In some instances, the deployment event may be referred to as an approximate and/or discovered deployment event, as the date/time used for the model creation may not be completely accurate. For instance, in the previous example, the deployment event may be the same date/time as the promotion event. In reality, the machine learning model may have gone through various tests and debugging in a pre-production environment before being promoted into production. In some instances, the pre-production environment may be near enough to the production environment (for example, the model may not spend much time in the pre-production environment) to help give a general estimation of when the deployment event occurred. Therefore, the deployment event may be an approximate deployment event. Even though the deployment event, in this example, may not be completely accurate, it may still be beneficial to have an estimate/approximation of the deployment event.

In some instances, the information about when the machine learning model was deployed and/or placed into pre-production may be used to approximate a deployment event. For instance, using the previous example, it may be estimated that a model may spend approximately one day in a pre-production environment. Therefore, to determine an approximate deployment event, one day may be subtracted from the promotion event (at Sep. 15, 2015 at 12:02 AM), resulting in an approximate deployment event of Sep. 14, 2020 at 12:02 AM. In some embodiments, the system may analyze other machine learning models and their deployment and promotion events in order to determine an average time spent in the pre-production environment. This average time spent in pre-production may be used (for example, subtracted from the promotion event) to determine an approximate deployment event, in some instances.

In another example, the machine learning system may include information that a debugging of the machine learning model (after it has been in production) is occurring at 12:05 AM on Nov. 29, 2018. This information, in this example, may not be stored on the lineage system but may be accessible via the crawling of the machine learning system. In this example, Nov. 29, 2018 (at 12:05 AM) may be the earliest mention of the machine learning model being in pre-production or production, therefore Nov. 29, 2018 may be used for the deployment event of the machine learning model.

Once the deployment event is determined, method 100 may proceed to operation 140. Additionally, if it is determined (in operation 130) that there is not a missing deployment event, method 100 may proceed to operation 140.

Method 100 includes operation 140 to determine whether there is a missing promotion event for the machine learning model. A promotion event may be a lineage event for when the machine learning model is promoted from pre-production to production. For example, a machine learning model may go through various tests and debugging during a pre-production phase and then, after passing the tests, may be released into production. The release into production may be the promotion event, in this instance. Determining whether there is a missing promotion event may include searching a lineage system (for example, for the machine learning system) for a promotion event for the machine learning model. If there is no lineage system and/or no information about any lineage events, then the machine learning model may be missing all of its lineage events. In some instances, if there is a lineage system and/or stored information about lineage of machine learning models, but no information about the specific machine learning model, then the machine learning model may be missing all of its lineage events.

In some instances, if there is a lineage system and/or stored information about lineage of machine learning models, and if the stored information includes information about the specific machine learning model, then the information may need to be reviewed/analyzed to determine whether there is a promotion event for the machine learning model. Reviewing and/or analyzing the information about the specific machine learning model (for example, in a lineage system (e.g., lineage system 400 (FIG. 4))) may include determining whether there is any information about when the machine learning model was released into production. In some instances, if there is information about when the machine learning model was released into production, then a creation event may exist. In some instances, even if information about when the machine learning model was released into production exists, if this information is not stored in the lineage system as a lineage event, then there may still be a missing promotion event for the model. If there is not information about when the machine learning model was released into production, then there may be a missing promotion event for the model.

If it is determined (in operation 140) that there is a missing promotion event, method 100 may proceed to operation 145 to generate the promotion event. Generating the promotion event may include at least determining a time that the promotion into production occurred, and generating (for example, including storing) the promotion event with the promotion time in the lineage system.

In some embodiments, generating the promotion event includes comparing the machine learning model to one or more pre-production models and one or more post-production models on a machine learning system. The machine learning system may house the machine learning model and other machine learning models. The machine learning system may be crawled in order to identify other machine learning models that are in a pre-production phase (or environment). Additionally, the machine learning system may be crawled in order to identify other machine learning models that are in a post-production phase (for example, that are now in production or even removed from production). In some embodiments, the specific machine learning model may be compared to each identified pre-production model (e.g., that is in a pre-production phase) and each identified post-production model (e.g., that is in production and/or removed from production) to determine the similarities and differences between each model.

In some embodiments, comparing the machine learning model to one or more pre-production models includes comparing at least a name, input schema, and output schema of the machine learning model to a name, input schema, and output schema of the pre-production models. Reviewing the names, input schemas, and/or output schemas of the models may help determine the similarities (and differences) between the machine learning model and each pre-production model. For instance, the input schema may include the attributes and data types of the input data and the output schema may include the attributes and data types of the output data. In some embodiments, the name, input schema, and output schema of the machine learning model and of each pre-production model may be used to determine one or more pre-production models that are most similar to the machine learning model (for example, by weighting the name, input schema, and output schema, in some instances).

In some embodiments, comparing the machine learning model to one or more post-production models includes comparing the name, input schema, and output schema of the machine learning model to a name, input schema, and/or output schema of the post-production models. Reviewing the names, input schemas, and/or output schemas may help determine the similarities (and differences) between the machine learning model and each post-production model. In some embodiments, the name, input schema, and output schema of the machine learning model and of each pre-production model may be used to determine one or more post-production models that are most similar to the machine learning model (for example, by weighting the name, input schema, and output schema, in some instances). In some embodiments, the similar pre-production models and the similar post-production models may be analyzed to determine whether any of the similar pre-production models were promoted into the post-production models. If so, the date of promotion (and other relevant information related to the promotion) may be used to generate the promotion event for the machine learning model.

In some embodiments, the name, input schema, and output schema of the machine learning model, the pre-production models, and the post-production models may be analyzed to determine if any of the pre-production models have been promoted into production (for example, and now have a post-production model). From the one or more pre-production models that have been promoted into a post-production model, the pre-production/post-production model pair that is most similar to the machine learning model (for example, determined using the name, input schema, and output schema) may be identified, and the promotion date for the most similar pair may be used for the promotion event for the machine learning model.

Once the promotion event is generated, method 100 may proceed to operation 150. Additionally, if it is determined (in operation 140) that there is not a missing promotion event, method 100 may proceed to operation 150.

Method 100 includes operation 150 to determine whether there is a missing version change event for the machine learning model. A version change event may be a lineage event for when the machine learning model changes versions. For example, the machine learning model may be updated into a second version of the same model (for example, in response to user feedback, debugging, model issues, etc.). Determining whether there is a missing version change event may include searching a lineage system (for example, for the machine learning system) for a version change event for the machine learning model. If there is no lineage system and/or no information about any lineage events, then the machine learning model may be missing all of its lineage events. In some instances, if there is a lineage system and/or stored information about lineage of machine learning models, but no information about the specific machine learning model, then the machine learning model may be missing all of its lineage events.

In some instances, if there is a lineage system and/or stored information about lineage of machine learning models, and if the stored information includes information about the specific machine learning model, then the information may need to be reviewed/analyzed to determine whether there is a version change event for the machine learning model. Reviewing and/or analyzing the information about the specific machine learning model (for example, in a lineage system (e.g., lineage system 400 (FIG. 4))) may include determining whether there is any information about when the version of the machine learning model changed. If there is information about when the machine learning model changed versions, then a version change event may exist. If there is not information about when the machine learning model changed versions, then there may be a missing version change event for the model.

If it is determined (in operation 150) that there is a missing version change event, method 100 may proceed to operation 155 to generate the version change event. In some embodiments, generating the version change event may include tracking the machine learning model and its predictions over time. In some instances, the version change event may be determined for time periods after the machine learning system was registered and/or granted permission to access it. The various models on the machine learning system may not be tracked until access is granted, in some instances. In some instances, generating the version change event may include identifying predictions made by the machine learning model that have a low confidence, and seeing if the machine learning model at a later time has changed it prediction values for those specific instances. Predictions made by the machine learning model that have a low confidence may be less accurate of predictions, and may be a result of problem areas of the machine learning model (for example, that may be identified via user feedback, tests, debugging, etc.). These less accurate predictions may lead to updates to the machine learning model (for example, to increase the accuracy of the predictions), which may result in a new version of the machine learning model. Generating a version change event is further discussed herein and depicted in FIG. 2 (e.g., method 200).

Once the version change event is determined, method 100 may proceed to operation 160. Additionally, if it is determined (in operation 150) that there is not a missing version change event, method 100 may proceed to operation 160.

Method 100 includes operation 160 to determine whether there is a missing batch scoring event for the machine learning model. A batch scoring event may be a lineage event indicating when predictions by the machine learning model were made in bulk. Scoring, as referred to herein, may include using the machine learning model to execute a prediction. For instance, scoring the machine learning model may include predicting various outputs via the machine learning model. Determining whether there is a missing creation event may include searching a lineage system (for example, for the machine learning system) for a creation event for the machine learning model. If there is no lineage system and/or no information about any lineage events, then the machine learning model may be missing all of its lineage events. In some instances, if there is a lineage system and/or stored information about lineage of machine learning models, but no information about the specific machine learning model, then the machine learning model may be missing all of its lineage events.

In some instances, if there is a lineage system and/or stored information about lineage of machine learning models, and if the stored information includes information about the specific machine learning model, then the information may need to be reviewed/analyzed to determine whether there is a batch scoring event for the machine learning model. Reviewing and/or analyzing the information about the specific machine learning model (for example, in a lineage system (e.g., lineage system 400 (FIG. 4))) may include determining whether there is any information about using the machine learning model for a bulk (or batch) prediction.

If it is determined (in operation 160) that there is a missing batch scoring event, method 100 may proceed to operation 165 to generate the batch scoring event. To generate the batch scoring event, the source storage and the target storage of the machine learning system may be analyzed. The machine learning model may have read input data points from the source storage, made predictions, and stored the outputs of the predictions in target storage. When the source data and target data (for example, stored in source storage and target storage, respectively) are used in a batch prediction, multiple tables may be generated/stored for each source data input and target data output. The source data and target data may be mapped and then used to generate the batch scoring event. In some instances, the source data and target data may include dates and/or times that the data was stored. Therefore, by mapping the source data to the target data and determining which source data was used to predict which target data, the approximate times that the batch scoring, or batch predictions, occurred may be determined. Generating a batch scoring event is further discussed herein and depicted in FIG. 3 (e.g., method 300).

Once the batch scoring event is generated, method 100 may proceed to operation 170. Additionally, if it is determined (in operation 160) that there is not a missing batch scoring event (for instance, if a batch scoring event was already recorded or if no batch predictions occurred), method 100 may proceed to operation 170.

Method 100 includes operation 170 to create the lineage path. A lineage path may be a pathway (for example, a timeline, a lineage tree, etc.) that represents the various events that have occurred for the machine learning model. The lineage path may show the connections between each event, in some instances, to help identify the connections between various models, various versions of each model, etc. The lineage path may be based on the various generated lineage events. For example, if the system generates a creation event, a deployment event, and a version change event, the lineage path may then be created based on the creation event, the deployment event, and the version change event. In some instances, creating the lineage path includes storing each generated lineage event (e.g., the creation event, deployment event, promotion event, version change event, batch scoring event, etc.) on the lineage system. In some instances, creating the lineage path includes ordering the various lineage events (for example, in a date/time order) to show the progression of the machine learning model through its various lineage events. An example lineage path is discussed further herein and depicted in FIG. 4.

Referring to FIG. 2, a method 200 for generating a version change event is depicted, according to some embodiments. In some embodiments, method 200 is executed by a server (e.g., computer system/server 502 (FIG. 5)) on or connected to a computer system (e.g., computer system 500 (FIG. 5)). In some embodiments, the method 200 is implemented as a computer script or computer program (e.g., computer executable code) to be executed on or connected to the computer system. In some embodiments, the method 200 is executed by a processor (e.g., processing unit 510 (FIG. 5)) on or connected to a computer system (e.g., computer system 500 (FIG. 5)). In some embodiments, method 200 may correspond to operation 155 (FIG. 1).

Method 200 includes operation 210 to identify one or more predicted data points with a low model confidence. In some embodiments, as discussed herein, the system may start tracking the machine learning model once it receives permission/access to do so by the machine learning system. When tracking the model, the system may be able to access the various predictions made by the model (for example, including the inputs and outputs) at, at least, times on and/or after the tracking has started. In some instances, the machine learning model may not always be very confident in the values it is predicting. A low model confidence may indicate that the machine learning model was not very confident in predicting the one or more predicted data points.

In some embodiments, identifying one or more predicted data points with a low model confidence includes operation 212 to determine a model confidence value for each data point predicted by the machine learning model. In some instances, when a machine learning model predicts the various data points, the machine learning model may also determine a model confidence value for each specific data point. Therefore, in some instances, determining a model confidence value for each data point may include identifying all the data points that have been predicted by the machine learning model (for example, via tracking the machine learning algorithms) and then identifying the model confidence value, or the model's confidence in its prediction, for each predicted data point.

In some embodiments, identifying one or more predicted data points with a low model confidence includes operation 214 to compare each model confidence value to a threshold model confidence value. The threshold model confidence value may indicate when the model confidence value is low for the machine learning model. The threshold model confidence value may be determined by the system, a user of the system, a developer, a client, etc. In some embodiments, the threshold model confidence value is a predetermined value based on the type of machine learning model. For example, if the machine learning model is a binary classification model, the threshold model confidence value for the machine learning model may be near 50%. Therefore, in some instances, for a binary classification model, the threshold model confidence could be 60%, 55%, 50%, 45%, etc. In another example, if the machine learning model is a multi-class classification model, the threshold model confidence may be 50%.

In some embodiments, identifying one or more predicted data points with a low model confidence includes operation 216 to determine that one or more data points have a confidence value less than or equal to the threshold model confidence value. For example, if the threshold confidence value is 50%, a predicted data point with a confidence value of 51% may not be considered a low confidence but a predicted data point with a confidence value of 45% may be considered a low confidence.

In some embodiments, identifying one or more predicted data points with a low model confidence includes operation 218 to flag the one or more data points for low model confidence. Flagging the one or more data points may mark them on the system, so that the system can monitor the data points with low model confidence. In some embodiments, the flagged one or more data points are the one or more predicted data points with a low model confidence. In some embodiments, if a large amount of predicted data points have a low confidence value, the system may not flag every data point with a low confidence value. For instance, the system may select values with the lowest confidence values, may select random values from the low confidence values, etc. for flagging, in order to help reduce the bandwidth and resources needed for the operation. For example, if there are more than 50 data points with a low confidence, the system may randomly select 15-20 data points from the 50 data points as the data points with a low model confidence.

Method 200 includes operation 220 to re-score the one or more predicted data points that were identified in operation 210. In some embodiments, the machine learning model may be rescored based on the machine learning model at a second time period. Put differently, the machine learning model may be initially identified at a first time period and then the model may be rescored at a second time period, the second time period after the first time period. For example, the system may initially go through and flag the data points that have a low confidence. Then, at a later time period (for example, a week later), the system may go back and review/revisit these flagged data points. In some instances, rescoring the data points may include determining whether the machine learning model still predicts the same data points when using the same input values. For example, the system may input the same input values (that correspond to the flagged data points) and may output updated predicted data points. Rescoring, as referred to herein, may include re-predicting the data points and/or determining whether the machine learning model still predicts the same data points. For example, the model may have initially inputted values 2 and 5 and outputted values 12 and 20, respectively. In this example, rescoring the model may include re-inputting the values 2 and 5 into the machine learning model at a later date (for instance, a week later), and determining whether the model still outputs values the same (or similar to) 12 and 20, respectively.

Method 200 includes operation 230 to determine whether the updated predicted data points are significantly different than the predicted data points. The updated predicted data points may be the output values of the machine learning model (for instance, using the same input values) at the second time instance, in some embodiments. In some embodiments, even if the model has not changed versions, the model may generate slightly different updated predicted data points (at the second time period) even though the same input values are used. For example, if the second time period is a month later, the machine learning model may have received more data and may have generated more predictions during that time, which may have further improved the model through its additional experience. Therefore, in this example, inputting the same input values into the machine learning model may result in a slightly different value. For instance, in this example, the original predicted data point may be 0.22 and the updated predicted data point may be 0.20. Therefore, in order to show that a model version has changed, the updated data point may need to be significantly different than the original predicted data point to avoid false positives due to the tendency of ML models to shift as discussed.

In some embodiments, determining whether the updated predicted data points are significantly different than the predicted data points includes comparing the updated one or more predicted data points with the one or more predicted data points. Comparing the respective data points may show whether there is any difference between the original predicted data points and the updated predicted data points. In some embodiments, determining whether the updated predicted data points are significantly different than the predicted data points includes calculating a difference factor of the updated one or more predicted data points based on the comparing. The difference factor may include a percentage, decimal, integer, etc. indicating a difference between the predicted data points and the updated predicted data points. For example, the flagged predicted data points may include data points 1, 5.2, 3, 4.1, and 10. The updated data points may include data points 0.5, 5.2, 3.8, 8.2, and 12. In this example, the difference factors may be 0.5, 0, 0.21, 0.5, and 0.167, respectively.

In some embodiments, determining whether the updated predicted data points are significantly different than the predicted data points includes determining whether the difference factor is greater than or equal to a threshold difference factor. In some embodiments, the threshold factor is a predetermined factor (e.g., determined by the system, a user, etc.). In some embodiments, the threshold difference factor may be determined based on the tracking and analyzing of the machine learning model. For example, the system may flag/track predicted data points with a high confidence factor and may determine updated high confidence predicted data points at the second time period. In this example, difference factors may be determined for the high confidence predicted data points and that difference factor may be used to determine the threshold difference factor. In some instances, when the difference factor is greater than or equal to a threshold difference factor, the updated one or more predicted data points are significantly different than the one or more predicted data points. In an example, the threshold difference factor may be determined to be 0.3. Using the above example, two out of the five data points may have a difference factor above the threshold difference factor. Therefore, in this example, data points 1 and 4.1 are significantly different than their corresponding updated predicted data points 0.5 and 8.2.

In some instances, when the difference factor(s) is not greater than or equal to the threshold difference factor, the updated one or more predicted data points are not significantly different than the one or more predicted data points. In some embodiments, if multiple data points are being analyzed, if any of the data points are significantly different than the updated predicted data points, then the updated one or more predicted data points are determined to be significantly different than the one or more predicted data points. In this instance, using the above example, because two data points are above the threshold difference factor, the updated predicted data points are significantly different than the predicted data points.

In some embodiments, if multiple data points are being analyzed, if a majority of data points are significantly different than the updated predicted data points, then the updated one or more predicted data points are determined to be significantly different than the one or more updated predicted data points. In this instance, using the above example, the data points would not be significantly different than the updated data points because only 2 out of the 5 data points are significantly different (i.e., not a majority).

In some embodiments, the difference factors of the various data points may be averaged to determine whether an average difference factor is above the threshold difference factor, and if so, the predicted data points are significantly different than the updated predicted data points. Again using the above example, in this instance, the average difference factor is 0.275, which is less than the threshold difference factor of 0.3. Therefore, in this example, the predicted data points are not significantly different than the updated predicted data points.

In some embodiments, if it is determined, in operation 230, that the updated predicted data points are not significantly different than the predicted data points, method 100 proceeds to operation 250 to determine that the machine learning model has not changed versions.

In some embodiments, if it is determined, in operation 230, that the updated predicted data points are significantly different than the predicted data points, method 200 proceeds to operation 240 to infer that there is a new version of the machine learning model. Because the updated predicted data points (using the same input values) are much different than the original predicted data points, the version of the model has likely changed (because the changes in predictions are more than the change that would typically occur when a model has simply gained more knowledge over a time period).

In some embodiments, method 200 includes operation 260 to generate the version change event. In some instances, the day/time that it was determined that there is a new version of the machine learning model (for example, in operation 230) may be used as the day/time of the version change event. The version change event may include the day/time of the version change as well as any other relevant information about the machine learning model and its version change. For example, the version change event may include the original data set used to create the model, the original machine learning model, a previous machine learning model version, etc. In some embodiments, generating the version change event includes storing the version change data for the machine learning model on the lineage system.

Figure 3:
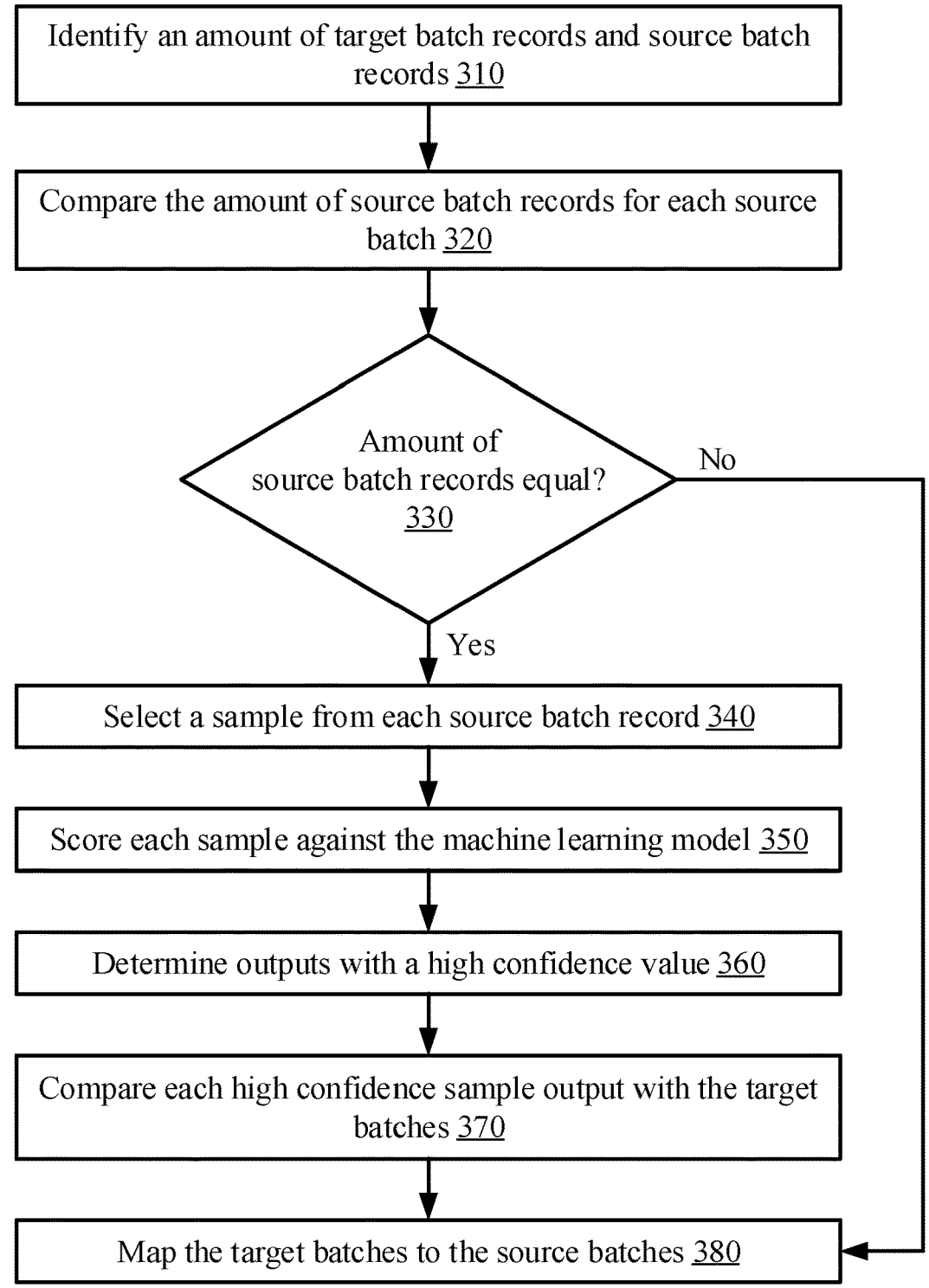
FIG. 3 depicts a flowchart of a set of operations for generating a batch scoring event, according to some embodiments.

Referring to FIG. 3, a method 300 for generating a batch scoring event is depicted, according to some embodiments. In some embodiments, method 300 is executed by a server (e.g., computer system/server 502 (FIG. 5)) on or connected to a computer system (e.g., computer system 500 (FIG. 5)). In some embodiments, the method 300 is implemented as a computer script or computer program (e.g., computer executable code) to be executed on or connected to the computer system. In some embodiments, the method 300 is executed by a processor (e.g., processing unit 510 (FIG. 5)) on or connected to a computer system (e.g., computer system 500 (FIG. 5)). In some embodiments, method 300 corresponds to operation 165 (FIG. 1).

Method 300 includes operation 310 to identify an amount of target batch records and source batch records for the machine learning model. When batch processing has occurred, the input and output data points may be stored in batches. For example, as discussed herein, when there is a batch prediction, there may be multiple tables stored on target storage and source storage for each input and output used for the batch scoring. Therefore, identifying an amount of target batch records and source batch records for the machine learning model may include identifying if there are batches for the machine learning model and how many records in each batch. If there is not a source batch or a target batch for the machine learning model (for example, only one table in source storage and one table in target storage, for a specific input/output), then batch scoring may not have occurred. If there are multiple tables, etc. for various source and target values, then batch processing may have occurred. Each input value and its corresponding tables/records may be referred to as a source batch. Each output value and its corresponding tables/records may be referred to as a target batch. Identifying an amount of source batch records may include determining how many records (e.g., tables, rows/columns in each table, etc.) there are for each source batch. Identifying an amount of target batch records may include determining how many records there are for each target batch. For example, one source batch may have two tables, one 2×4 table and one 2×7 table, and a second source batch may have three tables, two 2×4 tables and one 2×7 table.

Method 300 includes operation 320 to compare the amount of target batch records for each target batch and the amount of source batch records for each source batch. For example, one source batch may have records with a 2×4 table and a 2×7 table. Another source batch may have records with a 2×4 table and a 2×7 table. A third source batch may have records with a 3×5 table, a 2×10 table, and a 2×2 table. In some embodiments, the source batch and its corresponding target batch will have the same amount of records. Therefore, in some embodiments, only the amount of source batch records need to be compared.

Method 300 includes operation 330 to determine, based on the comparing, whether a plurality of source batch records have an equal amount of records. If multiple source batches have an equal amount of records, then it is unclear which source batch (from the source batches with equal records) should correspond to a specific target batch. Whereas, in some instances, if each source batch has a unique amount of records, then it may be clear which target batch corresponds to each source batch. For example, continuing the example above, the first source batch and the second source batch (each with a 2×4 table and a 2×7 table) have an equal amount of records. However, in this example, the third source batch has a unique amount of records as its 3×5, 2×10, and 2×2 tables do not match with any of the other source batches.

If it is determined, in operation 330, that the amount of source batch records for the source batch is unique, method 300 may proceed to operation 380 to map the target batches to the source batches. As discussed above, the amount of source batch records for the source batch may be unique when no other source batches (that correspond to the machine learning model) have a same amount of tables, size of tables, etc. as the source batch. In the above example, the third source batch may have a unique amount of source batch records. When mapping this unique source batch to its corresponding target batch, in operation 380, the target batch with an equivalent amount of batch records (for example, the same number of tables, sizes of tables, etc.) may be selected as the corresponding target batch, and may be mapped to the source batch with the unique amount of records.

If it is determined, in operation 330, that the amount of source batch records for the source batch is not unique, method 300 may proceed to operation 340 to select a sample from each source batch record with the equivalent amount of records. Selecting a sample from each source batch record may result in a plurality of samples. A sample may be a sample input value from the source batch record. For instance, each record (e.g., table) for a source batch may include one or more input values. A random input value may be selected for each source batch record as a sample. For example, using the above example with two source batches with equivalent amounts of records (the first source batch and the second source batch) an input value of 1.5 may be selected as a first sample from the first source batch (from the 2×4 table) and an input value of 1.2 may be selected as a second sample from the first source batch (from the 2×7 table). Additionally, in this example, an input value of 0.5 may be selected as a first sample from the second source batch (from the 2×4 table) and an input value of 0.7 may be selected as a second sample from the second source batch (from the 2×7 table).

Method 300 includes operation 350 to score each sample against the machine learning model. Scoring the sample may include inputting the sample into the machine learning model and predicting an output, the resulting predicted outputs may be referred to herein as sample outputs. Continuing the previous example, the input value of 1.5 may return a sample output of 9.2 and the input value of 1.2 may return a sample output of 10.7 for the first source batch, and the input value of 0.5 may return a sample output of 7.1 and the input value of 0.7 may return a sample output of 6.2.

Method 300 includes operation 360 to determine an output with a high confidence value for each source batch, based on the scoring. Determining a high confidence value for each source batch may include determining a confidence value for each sample output and then comparing the confidence values for each source batch. For example, for first source batch, the 1.5-9.2 prediction may have a confidence value of 85% and the 1.2-10.7 prediction may have a confidence value of 57%. For the first source batch, the 9.2 sample output has the highest confidence value. In this example, for the second source batch, the 0.5-7.1 prediction may have a confidence value of 67% and the 0.7-6.2 prediction may have a confidence value of 75%. The 6.2 sample output value has the highest confidence value for the second batch.

Method 300 includes operation 370 to compare each high confidence sample output with the target batches. In some embodiments, only the target batches with an equivalent amount of target batch records (compared to the amount source batch records) may be compared to the high confidence sample outputs. In some embodiments, comparing each high confidence sample output with the target batches may include identifying a target batch with an output, or outputs, most similar to the high confidence sample output. Continuing the previous example, it is now known that the first source batch is relatively confident in its prediction of 9.2 as the sample output. Therefore, the target batch that corresponds with the first source batch is likely to have one or more outputs (for example, in its records) that are similar to, or even equivalent to, 9.2. Similarly, in this example, the target batch that corresponds to the second source batch is likely to have one or more outputs that are similar to, or even equivalent to, 6.2. In this example, there may be two target batches with records including a 2×4 table and a 2×7 table, the first target batch may have outputs values (in its records) including 5.8, 6.3, and 6.8. The second target batch may have output values (in its records) including 9.7, 9.6, and 9.2. In this example, the first source batch may correspond to the second target batch and the second source batch may correspond to the first target batch.

Method 300 includes operation 380 to map the target batches to the source batches. The corresponding source and target batches may be mapped. For example, the first source batch may be mapped to the second target batch and the second source batch may be mapped to the first target batch. The mapped source batches and target batches may be used to generate the batch scoring event. In some instances, source data and target data that are included in the source batch records and/or target batch records may include dates and/or times that the data was stored. Therefore, by mapping the source data to the target data and determining which source data was used to predict which target data, the approximate times that the batch scoring, or batch predictions, occurred may be determined.

Figure 4:
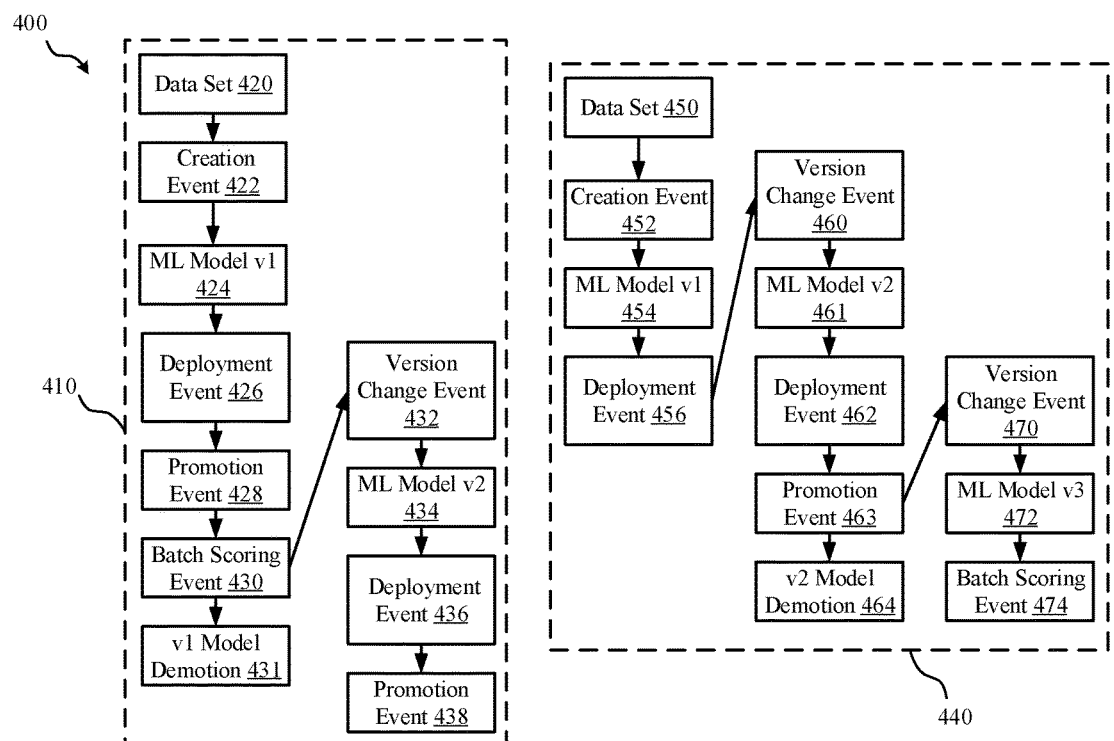
FIG. 4 depicts a block diagram of an example lineage path, according to some embodiments.

Referring to FIG. 4, a block diagram of an example lineage system 400 is depicted, according to some embodiments. In some embodiments, lineage system 400 is stored on a database, a memory, etc. Example lineage system 400 is just an example lineage system. Lineage system 400 may include any number of lineages paths and any number of connections (if any connections) between lineages. For example, in some instances, lineage system 400 may have a plurality of lineages and the lineages may be interconnected.

Example lineage system 400 may include a lineage path 410 and a lineage path 440. Lineage path 410 may correspond to data set 420 and lineage path 440 may correspond to data set 450. Put differently, lineage path 410 may follow all of the lineage events that occur that originated with data set 420. Lineage path 440 may follow all of the lineage events that occur that originated with data set 450.

Lineage path 410 may start with a data set 420. The data set 420 may be used to create a model in creation event 422. The model that has been created in the creation event 422 may be machine learning (ML) version 1 (v1) 424. In some instances, the data sets (e.g., data set 420 and data set 450) as well as the machine learning models themselves (e.g., ML model v1 424, ML model v2 434, ML model v1 454, ML model v2 461, and ML model v3 472) may not be a part of the lineage path in the lineage system, but may be depicted in FIG. 4 for clarification. Additionally, although not depicted for simplicity sake, each lineage event may include information about that lineage event, including at least a day and/or time of the lineage event.

ML model v1 424 may be deployed into a pre-production environment in deployment event 426 and then eventually promoted into a production environment in promotion event 428. After being promoted into a production environment, the ML model v1 424 may be used for batch scoring in batch scoring event 430. After batch scoring event 430, a new version of the model may be created in version change event 432. For example, the prediction model may not have succeeded in batch scoring (or batch predictions) therefore a new version of the model may be created that performs better during batch scoring. The new version of the ML model v1 424 is ML model version 2 (v2) 434. In some instances, after a new version of the ML model v1 424 was created, the ML model v1 may eventually be demoted, or removed, from the production environment. This is represented as v1 model demotion 431. For example, the model may no longer be used in any products or services, so it may no longer be in production. In some instances, before the model is demoted from the production environment, it may still be used by various clients and/or programs. Put differently, multiple versions of the model may be in production. In some embodiments, once the model is demoted out of production, it may still be used by the system and/or machine learning system. For example, ML model v1 424, and its corresponding data, may be used to determine a threshold model value (for example, as used in operation 214 (FIG. 2). In another example, ML model v1 424 may be a post-production model that may be used as a similar post-production model to help identify promotion events for other models. In lineage path 410, the new version of the model, ML model v2 434 may be deployed into pre-production and then eventually promoted into production in deployment event 436 and promotion event 438, respectively.

In some embodiments, lineage path 410 may be considered a single lifecycle of the machine learning model (e.g., ML model v1 424). In some embodiments, lineage path 410 may be considered multiple lifecycles, one for ML model v1 424 and one for ML model v2 434. For example, lineage events 422, 426, 428, and 430 may all be a part of the lifecycle of ML model v1 424, and lineage events 432, 436, and 438 may all be a part of the lifecycle of ML model v2 434.

Lineage system 400 includes a second lineage path 440. Lineage path 440 starts with a data set 450 that becomes ML model v1 454 in creation event 452. After the model 454 is created, it is deployed into pre-production in deployment event 456. After deployment event 456, a new version of the model is created in a version change event 460. For example, the ML model v1 454 may not have performed well during the pre-production environment. In some instances, ML model v1 454 may still be used in pre-production, therefore is has not been demoted from pre-production.

Version change event 460 may create a new version of the machine learning model, ML model v2 461. This version of the model may be deployed into pre-production and then promoted into production in deployment event 462 and promotion event 463, respectively. After being promoted into production, the model may undergo another version change in version change event 470, becoming ML model v3 472. In some instances, ML model v2 461 may be removed from production in v2 model demotion event 464. ML model v3 472 may be used to do batch predictions in batch scoring event 474. In some instances, there may be some missing events before batch scoring event 474. For example, the ML model v3 472 may have been deployed and promoted before being used for batch scoring. Therefore, in this example, there may be a deployment event and a promotion event missing from lineage path 440. In some instances, method 100 may be used to discover and generate the missing lineage events for the machine learning model.

Figure 5:
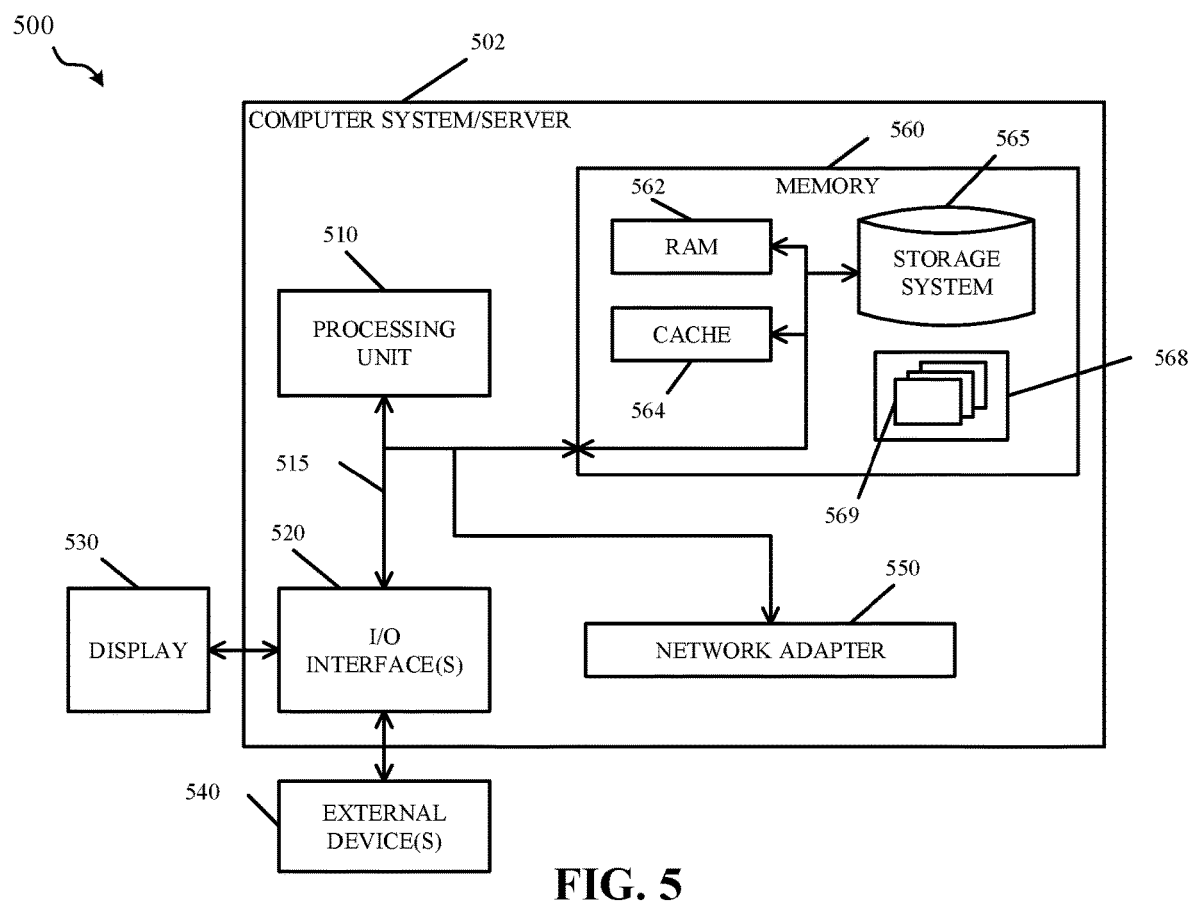
FIG. 5 depicts a block diagram of an example computer system environment, according to some embodiments.

Referring to FIG. 5, computer system 500 is a computer system/server 502 is shown in the form of a general-purpose computing device, according to some embodiments. In some embodiments, computer system/server 502 is located on the linking device. In some embodiments, computer system/server 502 is connected to the linking device. The components of computer system/server 502 may include, but are not limited to, one or more processors or processing units 510, a system memory 560, and a bus 515 that couples various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the disclosure.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying a machine learning model with missing lineage;
generating a creation event and deployment event for the machine learning model;
generating a batch scoring event for the machine learning model, wherein the generating the batch scoring event comprises:
identifying an amount of target batch records for each target batch and an amount of source batch records for each source batch for the machine learning model;
comparing the amount of source batch records for each source batch;
determining, based on the comparing, whether a plurality of source batch records have an equal amount of records; and
mapping, based on the determining, each source batch to each corresponding target batch;
generating a version change event for the machine learning model, wherein generating the version change event comprises:
identifying a plurality of predicted data points with a model confidence less than or equal to a threshold model confidence value,
rescoring a plurality of predicted data points based on the machine learning model at a second time period, resulting in an updated plurality of predicted data points,
determining that the updated plurality of predicted data points are significantly different than the plurality of predicted data points, wherein the determining comprises:
calculating a difference factor between the updated plurality of predicted data points and the plurality of predicted data points, and
comparing the difference factor to a threshold difference factor, and
inferring, based on the determining, that there is a new version of the machine learning model; and
creating a lineage path for the machine learning model based on the batch scoring event, the creation event, the deployment event, and the version change event.

2. The method of claim 1, wherein identifying the plurality of predicted data points with the model confidence less than or equal to a threshold model confidence value comprises:
  determining a model confidence value for each data point predicted by the machine learning model;
  comparing each model confidence value to a threshold model confidence value;
  determining that a plurality of data points have a confidence value less than or equal to the threshold model confidence value; and
  flagging the plurality of data points for low model confidence.

3. The method of claim 2, wherein the threshold model confidence value is a predetermined value based on a type of machine learning model.

4. The method of claim 1,
  wherein the batch scoring event is a lineage event indicating when predictions by the machine learning model were made in bulk.

5. The method of claim 1, further comprising generating a promotion event for the machine learning model, wherein the promotion event is a lineage event indicating when the machine learning model is promoted to a production environment.

6. The method of claim 5, wherein generating the promotion event comprises:
  comparing the machine learning model to one or more pre-production models and one or more post-production models on a machine learning system, wherein the machine learning system houses the machine learning model.

7. The method of claim 6, wherein the comparing the machine learning model to one or more pre-production models and one or more post-production models comprises:
  comparing at least a first input schema and a first output schema of the machine learning model to a second input schema and a second output schema of the one or more pre-production models; and
  comparing at least the first input schema and the first output schema of the machine learning model to a third input schema and a third output schema of the one or more post-production models.

8. The method of claim 1, wherein identifying the machine learning model with missing lineage comprises:
  receiving access to a machine learning system, the machine learning housing one or more machine learning models;
  crawling the machine learning system;
  discovering, in response to the crawling, the machine learning model;
  searching the lineage system for the machine learning model; and
  determining that one or more historical lineage events are missing for the machine learning model.

9. The method of claim 1, wherein the threshold difference factor is a difference factor determined for a high confidence predicted data point.

10. The method of claim 1, wherein the generating the batch scoring event further comprises:
  determining that the plurality of source batch records have an equal amount of records;
  selecting a sample from each source batch record of each source batch, resulting in a plurality of samples;
  scoring each sample from the plurality of samples against the machine learning model;
  determining an output for each source batch from the scoring with a highest confidence value, resulting in high confidence sample outputs;
  comparing each high confidence sample output from the high confidence sample outputs with the target batches; and
  mapping the each source batch to each corresponding target batch based on the comparing.

11. A system having one or more computer processors, the system configured to:
  identify a machine learning model with missing lineage;
  generate a creation event and deployment event for the machine learning model;
  generate a batch scoring event for the machine learning model, wherein generating the batch scoring event comprises:
    identifying an amount of target batch records for each target batch and an amount of source batch records for each source batch for the machine learning model, comparing the amount of source batch records for each source batch,
    determining, based on the comparing, whether a plurality of source batch records have an equal amount of records, and
    mapping, based on the determining, each source batch to each corresponding target batch; and
  create a lineage path for the machine learning model based on the creation event, the deployment event, and the batch scoring event.

12. The system of claim 11, wherein generating the batch scoring event further comprises:
  determining that the plurality of source batch records have an equal amount of records;
  selecting a sample from each source batch record of each source batch, resulting in a plurality of samples;
  scoring each sample from the plurality of samples against the machine learning model;
  determining an output for each source batch from the scoring with a highest confidence value, resulting in high confidence sample outputs;
  comparing each high confidence sample output from the high confidence sample outputs with the target batches; and
  mapping the each source batch to each corresponding target batch based on the comparing.

13. The system of claim 11, further configured to:
  generate a version change event for the machine learning model.

14. The system of claim 13, wherein generating the version change event comprises:
  identifying one or more predicted data points with a low model confidence;
  rescoring the one or more predicted data points based on the machine learning model at a second time period, resulting in updated one or more predicted data points;
  determining that the updated one or more predicted data points are significantly different than the one or more predicted data points; and
  inferring, based on the determining, that there is a new version of the machine learning model.

15. The system of claim 14, wherein determining that the updated one or more predicted data points are significantly different than the one or more predicted data points comprises:
  comparing the updated one or more predicted data points with the one or more predicted data points;
  calculating a difference factor of the updated one or more predicted data points based on the comparing; and determining that the difference factor is greater than or equal to a threshold difference factor.

16. The system of claim 11, wherein identifying the machine learning model with missing lineage comprises:
   receiving access to a machine learning system, the machine learning housing one or more machine learning models;
   crawling the machine learning system;
   discovering, in response to the crawling, the machine learning model;
   searching the lineage system for the machine learning model; and
   determining that one or more historical lineage events are missing for the machine learning model.

17. The system of claim 11, further comprising generating a promotion event for the machine learning model, wherein the promotion event is a lineage event indicating when the machine learning model is promoted to a production environment.

18. The system of claim 11, wherein generating the creation event comprises crawling the machine learning system to determine an earliest date when the machine learning model was mentioned or stored on the machine learning system.

19. A computer program product comprising a computer readable storage medium having program instructions embodied therewith, the program instructions executable by a server to cause the server to perform a method, the method comprising:
   identifying a machine learning model with missing lineage;
   generating a batch scoring event for the machine learning model, wherein the generating the batch scoring event comprises:
      identifying an amount of target batch records for each target batch and an amount of source batch records for each source batch for the machine learning model;
      comparing the amount of source batch records for each source batch;
      determining, based on the comparing, whether a plurality of source batch records have an equal amount of records; and
      mapping, based on the determining, each source batch to each corresponding target batch;
   generating a creation event and deployment event for the machine learning model;
   generating a version change event for the machine learning model, wherein generating the version change event comprises:
      identifying a plurality of predicted data points with a model confidence less than or equal to a threshold model confidence value,
      rescoring a plurality of predicted data points based on the machine learning model at a second time period, resulting in an updated plurality of predicted data points,
      determining that the updated plurality of predicted data points are significantly different than the plurality of predicted data points, wherein the determining comprises:
         calculating a difference factor between the updated plurality of predicted data points and the plurality of predicted data points, and
         comparing the difference factor to a threshold difference factor, and
      inferring, based on the determining, that there is a new version of the machine learning model; and
   creating a lineage path for the machine learning model based on the batch scoring event, the creation event, the deployment event, and the version change event.

20. The computer program product of claim 19, wherein the batch scoring event is a lineage event indicating when predictions by the machine learning model were made in bulk.

* * * * *